UNITED STATES PATENT OFFICE.

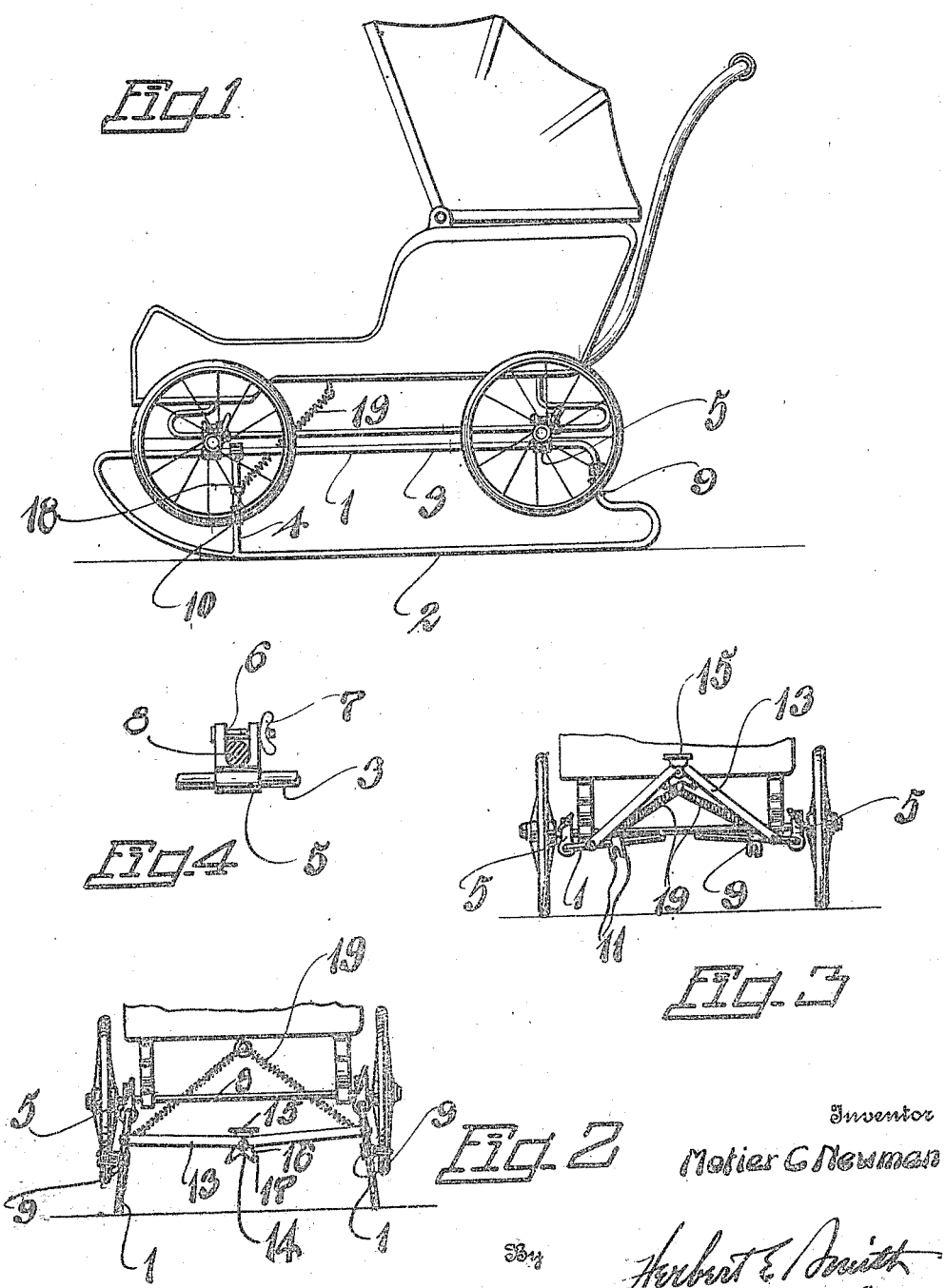

MOTIER C. NEWMAN, OF SPOKANE, WASHINGTON.

SLED-RUNNER.

1,234,200.  Specification of Letters Patent.  Patented July 24, 1917.

Application filed March 12, 1917. Serial No. 154,335.

*To all whom it may concern:*

Be it known that I, MOTIER C. NEWMAN, a citizen of the United States, residing at Spokane, in the county of Spokane and State of Washington, have invented certain new and useful Improvements in Sled-Runners, of which the following is a specification.

The present invention relates to sled runners of that type adapted to be secured to the wheel shafts of baby carts and the like, and especially to that type of cart that folds and the device of my invention is so constructed that it will normally be folded against the under side of the wheel shafts in such a way that it may be instantly disposed for use as a sled.

It is an object of my invention to provide a device of the above stated character whereby in the folded runners may be disposed to provide sled means for the cart by the pressure of the foot upon a foot pedal located conveniently at the rear of the vehicle.

It is another feature of my invention to provide spring tension means whereby a slight upward pressure upon the foot pedal will serve to instantly release the runners, fold them and securely maintain them in that position.

A still further object of the invention is the provision of the device of the above stated character which shall be simple in construction, durable in use and may be manufactured and sold at a minimum cost.

With the above and other objects in view the invention consists of the novel features, details of construction and combination of parts as will be hereafter more fully set forth, illustrated in the accompanying drawing, and pointed out in the appended claims.

In the drawing:—

Figure 1 is a view of a baby cart of the usual type with the runners attached to convert it into a sled.

Fig. 2 is a partial rear view of a cart used as a sled.

Fig. 3 is a similar view with the runners folded and the cart depending upon the wheels for transportation.

Fig. 4 is a detail showing the means of attachment of the runners to the wheel shafts.

Referring more particularly to the drawing, reference being had to Fig. 1, the numeral 1 is the runner portion of my invention which consists of a one-piece member bent to provide a runner portion 2, and an upper parallel portion 3, by which the runner is pivotally connected to the wheel shafts of the cart. At 4 is a bridge connecting the runner 2 and the upper portion 3 which affords the means of supporting attachments which will later be described. To the upper runner member 3 at the proper interval, is disposed a clamp 5 provided with a U-shaped opening 6 and a thumb screw 7 by which means a secure fastening is maintained with the wheel shaft 8. The engagement with the upper runner portion 3 is somewhat loose to provide pivotal movement of the runner about the clamp 5. A similar clamping means is provided for each of the connections of the wheel shafts and at a further point upon the runner, as 9, and upon the bridge at 10, are provided wheel engaging members provided with forked ends 11 which engage the tire of the wheel to help maintain the runner portions rigid by reason of the fork member engaging the inner and outer peripheries of the wheel tire.

Upon the rear of the carriage and pivotally connecting with the runner at 12, are disposed operating members 13 which also serve when the runners are disposed for use to act as braces for said runners to maintain them slightly out-spread past the perpendicular as better shown in Fig. 2. These members are pivotally connected at 14, the point of meeting, and the pivot thereof also engages a step member 15 which is somewhat flattened and extending toward the rear to be easily engaged by the foot for disposing the runners into use. Below the pivotal connections therewith it is provided with fork members 16 carrying pins 17, the purpose of which is to maintain the foot lever in a horizontal position when the runners are folded as better shown in Fig. 3, at which time the pins 17 engage with the members 13 to dispose the step horizontally.

To the bridge member 4 of the runner, at 18, is secured a clip and to this is secured a tension spring 19 fastened somewhat centrally of the cart body and under tension at all times. When the runners are disposed for use, the spring is somewhat extended, but when the toe of the shoe is placed against the step 15 and the locking members 13 have been slightly raised on the inner end the spring will cause the runners to snap into a folded position and be securely maintained there.

The device of my invention is especially useful at such times as the snow outside prevents the use of wheel vehicles and in that case I have available at all times runners. When the cart is to be used in the house, store or other place the runners may be quickly and easily disposed in their folded position at which time the wheels may come into use and when the cart is taken outside, the runners, by pressure upon the foot plate, may be disposed for instant use without trouble or inconvenience. By reason of the simple attachment that I have provided the runners may be easily removed from the cart during the summer time and be again attached when the season changes.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claims appended hereto.

I claim:—

1. In a device of the class described, a pair of sled runners pivotally secured to the wheel shafts of a cart, of fork members thereon engaging with wheels for outward support of the runners, a foot pedal and link members secured therewith and pivotally connecting the runners whereby a downward pressure will dispose the runners for use and an upward pressure will fold them against the wheel shafts.

2. In a device of the class described, a pair of sled runners pivotally secured to the wheel shafts of a cart, an upright standard supported on said runners, a tension spring engaged therewith and secured to the body of the cart to maintain the runners folded, fork members on the runners engaging with the wheels for outward support of the runners, link members pivotally connected to the rear of said runners for inward bracing, a foot pedal connecting with the two brace members and so disposed that a downward pressure will engage the runners for use and an upward pressure will cause them to fold against the wheel shafts, and means on said foot pedal for maintaining same in a horizontal plane.

3. In a device of the class described, a pair of sled runners pivotally secured to the wheel shafts of a cart and in spaced parallel relation therewith, of forked members thereon engaging the wheel for outward support, of a lever pivotally secured to the runners at the rear thereof and pivotally connecting each other at the center, a foot pedal disposed through the same pivotal connection and provided with a foot plate and downward depending forked members supporting pins, and said pins engaging the brace members to maintain the pedal in horizontal position, spring means secured to the cart and to the runners for maintaining the latter in folded position, and means whereby pressure upon the pedal will cause the runners to be unfolded for use and locked thereby.

In testimony whereof, I affix my signature.

MOTIER C. NEWMAN.